United States Patent
Ostri

(10) Patent No.: US 10,824,828 B2
(45) Date of Patent: Nov. 3, 2020

(54) SYSTEMS AND METHODS FOR FACILITATING A SECURED TRANSACTION BETWEEN A MOBILE DEVICE AND A SERVICE MACHINE

(71) Applicant: Ronen Ostri, Kadima (IL)

(72) Inventor: Ronen Ostri, Kadima (IL)

(73) Assignee: Ronen Ostri, Kadima ( * ) Notice: Subject to any disclaimer, the term of this patent is extended or adjusted under 35 U.S.C. 154(b) by 0 days.

(21) Appl. No.: 16/396,718

(22) Filed: Apr. 28, 2019

(65) Prior Publication Data

US 2019/0332828 A1 Oct. 31, 2019

Related U.S. Application Data

(60) Provisional application No. 62/664,166, filed on Apr. 29, 2018.

(51) Int. Cl.
*G06K 7/10* (2006.01)
*G06Q 20/32* (2012.01)

(52) U.S. Cl.
CPC ..... *G06K 7/10217* (2013.01); *G06K 7/10128* (2013.01); *G06Q 20/3278* (2013.01)

(58) Field of Classification Search
CPC ........... G06K 7/10217; G06K 7/10128; G06Q 20/3278
USPC ........................................................ 455/41.1
See application file for complete search history.

(56) References Cited

U.S. PATENT DOCUMENTS

| | | | |
|---|---|---|---|
| 4,613,990 A * | 9/1986 | Halpern | H04W 52/343 455/436 |
| 8,856,045 B1 | 10/2014 | Patel et al. | |
| 9,659,296 B2 | 5/2017 | Patel | |
| 2005/0003763 A1 * | 1/2005 | Lastinger | H01Q 3/2605 455/63.1 |
| 2008/0154735 A1 | 6/2008 | Carlson | |
| 2013/0085943 A1 | 4/2013 | Takeda et al. | |
| 2013/0281018 A1 | 10/2013 | Wilson | |
| 2013/0326379 A1 | 12/2013 | Arrasvuori et al. | |
| 2014/0113591 A1 * | 4/2014 | Takai | H04W 12/06 455/411 |
| 2015/0332240 A1 | 11/2015 | Harwood et al. | |
| 2017/0193508 A1 | 7/2017 | Patel et al. | |
| 2019/0019210 A1 * | 1/2019 | Yamazaki | G07F 17/0035 |
| 2019/0109915 A1 * | 4/2019 | McPhee | H04L 67/26 |

* cited by examiner

*Primary Examiner* — Eugene Yun
(74) *Attorney, Agent, or Firm* — Nathan & Associates; Menachem Nathan

(57) ABSTRACT

Systems and methods for facilitating transactions between a mobile device and a service machine are disclosed. The system comprises a wireless radio frequency (RF) communication module configured to transmit a RF signal using a RF technology with a given operation range; and a hardware attenuation module configured to attenuate the RF signal to a predefined Transmitted Power Output (TPO) in a first attenuation mode such that communication between the apparatus and the mobile device starts only when the mobile device is positioned relative to the service machine in a detection range that is significantly smaller than the given operation range.

15 Claims, 10 Drawing Sheets

US 10,824,828 B2

SYSTEMS AND METHODS FOR FACILITATING A SECURED TRANSACTION BETWEEN A MOBILE DEVICE AND A SERVICE MACHINE

CROSS-REFERENCE TO RELATED APPLICATIONS

This application is related to and hereby claims the priority benefit of commonly-owned and U.S. Provisional Patent Application No. 62/664,166 filed Apr. 29, 2018.

FIELD

The present disclosed subject matter relates generally to Bluetooth Low Energy (BLE) technology. More specifically, the disclosed subject matter relates to using BLE for service machines, and in particular for unattended service machines.

BACKGROUND

Unattended self-service machines usually include coin or credit-card operated devices, and may include, for example: washing machines, vending machines, fuel pumps, ticketing machines, punch-clock machines, parking payment machines, point-of-sale (POS) machines, etc.

Near-Field Communication (NFC) technology has been considered to be the ultimate solution for payment in unattended service machines. As known to persons skilled in the art of short range radio frequency (RF) communication, NFC may enable users to establish contactless low-speed data communication between two devices in close-range. NFC communication is initiated by bringing the two devices in close proximity, within a limited detection range, and thus comfortably 'introducing' between them (e.g. by a gesture of a hand-held device) for the duration of the NFC connection. However, when integrated within a mobile device, NFC has demonstrates a variety of technical, operational and commercial limitations. For example:

NFC is good for inconveniently short-range, low bandwidth communication. In order to communicate between the devices at a higher bandwidth or over a more convenient larger distance, a handover to a second communication technology and protocol must be performed, requiring parallel implementation of two RF technologies on the communicating devices.

In order to communicate secure data between a service machine and a payment server via a mobile device, NFC requires keeping cryptographic keys on a Secure Element (SE) within the mobile device. The deployment of service machines that would support NFC communication with respective mobile devices is therefore both platform-dependent and dependent upon cooperation of the mobile device's manufacturers.

Card emulation of NFC on a mobile device may require supporting a plurality of NFC protocols and standards (e.g. supporting both type A and type B of ISO 14443 smartcard standards)

Different mobile device operating systems (OS) support different application programming interfaces (APIs) for their respective platforms. This puts additional strain on deployment of service machines that would be compliant with all, or most mobile platforms.

Furthermore, at present, NFC communication is not available on many mobile platforms.

In contrast, other short-range communication technologies, such as Bluetooth Low Energy (BLE) are widely supported by almost every mobile platform, support high speed data transactions, and may support secure, encrypted transactions between service machines and transaction servers via the mobile device.

A method and an apparatus or system are therefore required for short range communication in unattended service machines, that will provide the user with the same user experience as NFC, yet, provide platform independent, secure, convenient, high-speed and interactive communication between unattended service machines and a consumer's mobile phone.

SUMMARY

Hereinafter, the terms apparatus and system may be used interchangeably.

In contrast to the above, embodiments of apparatus disclosed herein enable users to comfortably establish a communication link between a mobile device and a transaction apparatus of a service machine by bringing these elements in close proximity, and henceforth facilitate high-speed data communication between them over an extended range, without a handover to a different communication technology and protocol.

According to some embodiments there is provided an apparatus configured to facilitate transactions between a mobile device and a service machine. The apparatus includes a wireless radio frequency (RF) communication module configured to transmit a RF signal using a RF technology with a given operation range; and a hardware attenuation module configured to attenuate the RF signal to a predefined Transmitted Power Output (TPO) in a first attenuation mode such that communication between the apparatus and the mobile device starts only when the mobile device is positioned relative to the service machine in a detection range that is significantly smaller than the given operation range.

According to other embodiments there is provided a method for facilitating transactions between a mobile device and a service machine. The method includes transmitting a radio frequency (RF) signal using a RF technology with a given operation range; and by a hardware attenuation module, attenuating the RF signal to a predefined Transmitted Power Output (TPO) in a first attenuation mode that communication between the apparatus and the mobile device starts only when the mobile device is positioned relative to the service machine in a detection range that is significantly smaller than the given operation range.

In some embodiments, the detection range is in the range of 0-25 cm.

In some embodiments, the apparatus includes a processor configured to command the attenuation module to attenuate the RF transmission signal in the first attenuation mode.

In some embodiments, the processor is further configured to command the attenuation module to switch between the first attenuation mode and a second attenuation mode, wherein the second attenuation mode is associated with a second level of attenuation and a second TPO level and has a transmission range larger than the detection range.

In some embodiments, the switch between the first attenuation mode and the second attenuation mode occurs upon completion of a handshake between the RF communication module and the mobile device.

In some embodiments, if the communication between the RF communication module and the mobile device is interrupted, or upon completion of a transaction between the mobile device and the service machine, the processor is further configured to command the attenuation module to switch back to the first attenuation mode.

In some embodiments, the wireless RF technology is selected from the group consisting of a Bluetooth Low Energy (BLE) technology, a Bluetooth technology, a WiFi technology and a WiFi direct technology.

In some embodiments, the hardware attenuation module is a hardware analog RF attenuation module.

In some embodiments, the hardware attenuation module is a hardware digital step RF attenuation module.

In some embodiments, the apparatus includes a secure access module (SAM) configured to store at least one of a symmetric and asymmetric cryptographic key for facilitating secure, end-to-end transactions between the service machine and a transaction server.

In some embodiments, the processor is further configured to receive transaction data from the service machine relating to a pending transaction, obtain at least one of a symmetric cryptographic key or an asymmetric cryptographic key from the secure access module, encrypt the transaction data using the at least one cryptographic key, communicate the encrypted transaction data to the mobile device, receive an encrypted transaction code data from the mobile device indicating whether the transaction has been successfully cleared by the transaction server, decrypt the received transaction code data, and send the decrypted transaction response data to the controller to finalize the transaction.

In some embodiments, in the first attenuation mode, the RF communication module is configured to initiate communication and perform the handshake with the mobile device over a SRC protocol.

In some embodiments, in the second attenuation mode, the RF communication module is configured to communicate with the mobile device over the same SRC protocol as used for the handshake.

BRIEF DESCRIPTION OF THE DRAWINGS

Non-limiting embodiments are herein described, by way of example only, with reference to the accompanying drawings, wherein.

DETAILED DESCRIPTION

In the following detailed description, numerous specific details are set forth in order to provide a thorough understanding of the disclosed subject matter. However, it will be understood by those skilled in the art that the present disclosed subject matter may be practiced without these specific details. In other instances, well-known methods, procedures, and components have not been described in detail so as not to obscure the present disclosed subject matter.

Embodiments of the disclosed subject matter disclose a system, an apparatus and a method for facilitating transactions and/or other exchanges of data between a mobile device (e.g. a smartphone, a tablet PC, a laptop computer, and the like) and an unattended service machine.

The term 'service machine' (and its abbreviated form "SM") is used throughout this document in reference to any type of unattended machine or device for vending a product or providing a service should also cover access control service. For example (and in a non-limiting way) and as mentioned above, the term service machine may refer to a washing machine, a vending machine, a fuel pump, a ticketing machine, a punch-clock machine, a parking payment machine and a POS machine.

The terms "wired or wireless data communication protocol" refer to any protocol for facilitating wired or wireless data communication (including combinations thereof), including but not limited to wired/wireless Internet Protocol (IP), Wifi, Bluetooth, or cellular communication protocols (e.g. W-CDMA, 3G, LTE, etc.).

Figure 1:
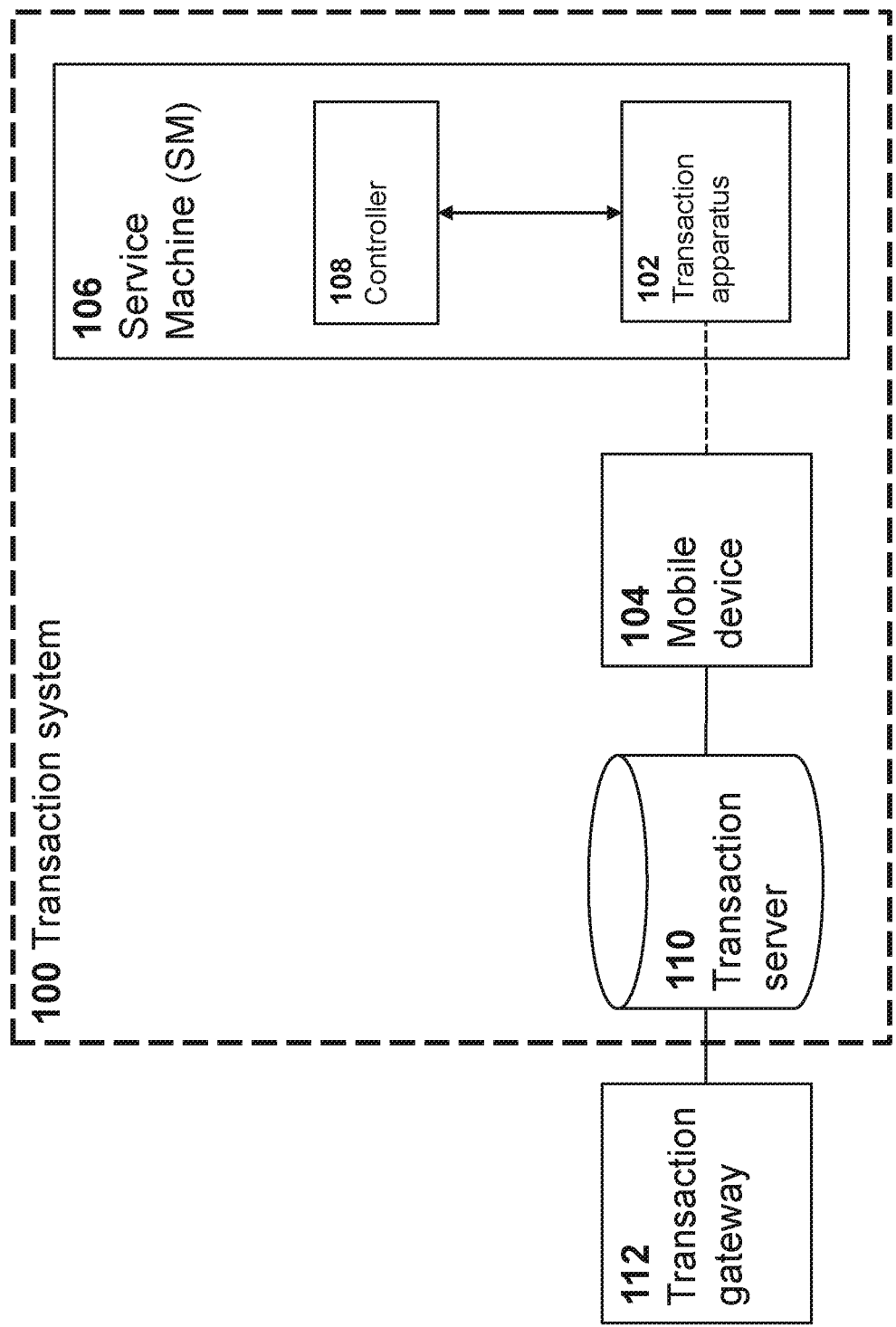
FIG. 1 shows a schematic block diagram depicting an embodiment of a system for facilitating secure transactions between a mobile device and an unattended service machine disclosed herein.

Reference is now made to FIG. 1 showing a schematic block diagram depicting an embodiment of a system for facilitating secure transactions between a mobile device and an unattended service machine.

According to some embodiments, the system 100 may include a transaction apparatus 102 configured to facilitate transactions, and a communicatively connected mobile device 104. Preferably, the transaction apparatus 102 and mobile device 104 are communicatively connected over a short range RF communication (SRC) protocol, including for example: Bluetooth, Bluetooth Low Energy (BLE), WiFi and WiFi direct.

According to some embodiments, transaction apparatus 102 may be associated with at least one unattended service machine ("SM") 106. SM 106 may be communicatively connected to a controller 108 configured to control at least one action of SM 106. According to some embodiments, transaction apparatus 102 may be implemented as a hardware entity separate from controller 108. According to other embodiments, transaction apparatus 102 may be integrated with controller 108 in a single hardware entity.

According to some embodiments, mobile device 104 may include any computerized device configured to communicate with transaction apparatus 102 over the SRC protocol, including for example: a smartphone, tablet PC, a laptop computer and the like.

According to some embodiments, mobile device 104 may be configured to communicatively connect to at least one transaction server 110 configured to convey secured data communication between transaction server 110 and transaction apparatus 102, as elaborated further below. Transaction server 110 may further connect to at least one other transaction gateway 112 configured to authorize transactions between transaction server 110 and transaction apparatus 102, as also elaborated further below.

Figure 2:
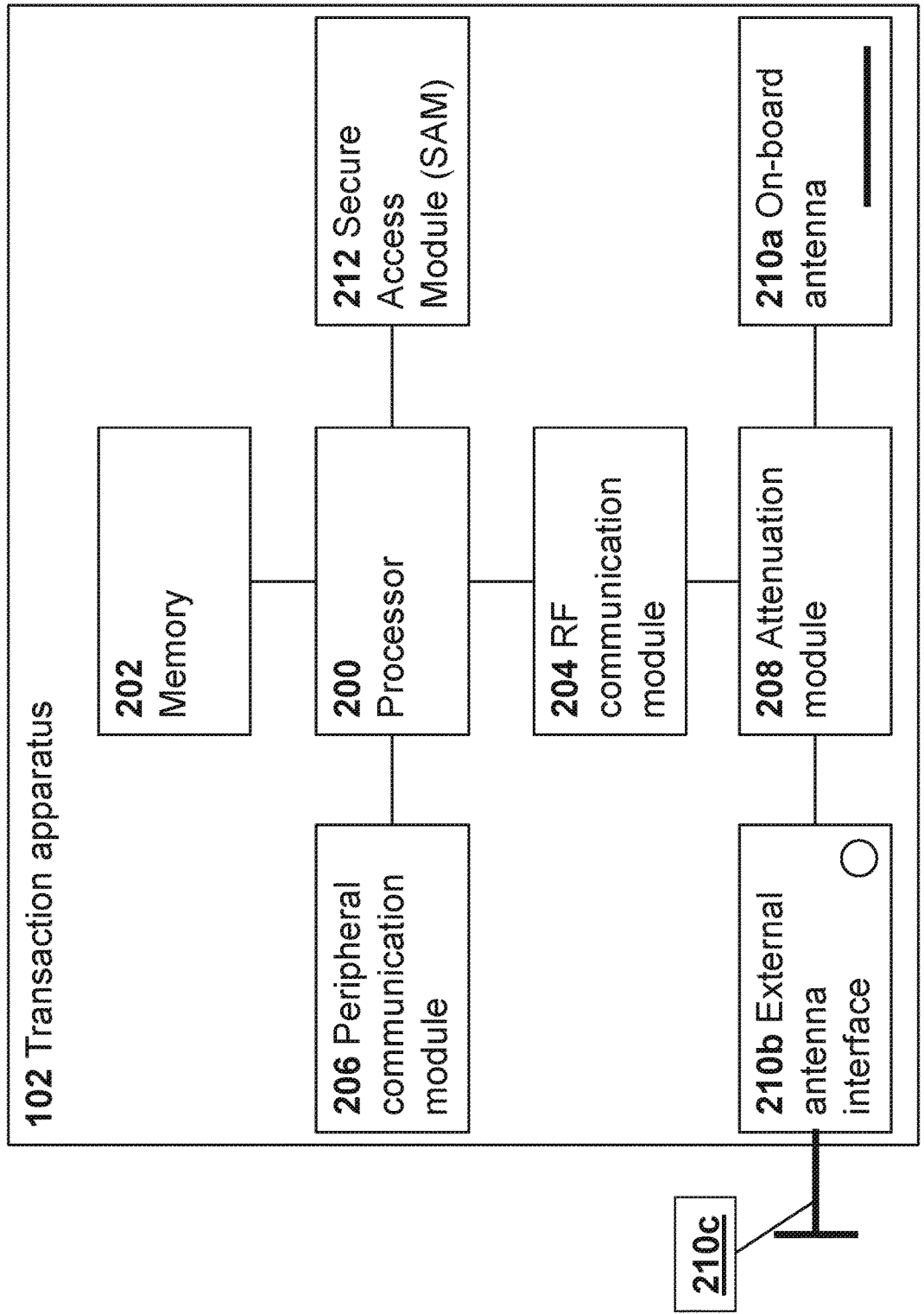
FIG. 2 shows a schematic block diagram depicting an embodiment of a transaction apparatus disclosed herein.

FIG. 2 shows a schematic block diagram depicting an embodiment of transaction apparatus 102. As shown in FIG. 2, transaction apparatus 102 may include a processor 200 and non-transitory memory 110. Processor 200 may be configured to execute modules of instruction code for implementing functions related to facilitating secure transactions between mobile device 104 and SM 106. The modules of instruction code may be stored in memory 110.

According to some embodiments, transaction apparatus 102 may further include a wireless radio-frequency (RF) communication module 204 configured to transmit a RF signal using a RF technology with a given operation range, and to communicate with a mobile device over the SRC protocol. Transaction apparatus 102 may further include a hardware attenuation module 208 configured to attenuate an RF transmission signal of RF communication module 204 to a predefined Transmitted Power Output (TPO). As will be elaborated below, attenuation module 208 may be configured to attenuate the RF signal in either a first attenuation mode associated with a first predefined TPO, or a second attenuation mode associated with a second predefined TPO, based upon the location of mobile device 104 and upon receiving a predetermined command from processor 200.

According to some embodiments, in the first attenuation mode, communication between the transaction apparatus 102 and the mobile device 104 starts only when the mobile device is positioned relative to the service machine 106 in a detection range that is significantly smaller than the given operation range of the RF communication module 204.

According to some embodiments, processor 200 may be configured to command attenuation module 208 to attenuate the RF transmission signal of the RF communication module 204 according to the first attenuation mode associated with the first predefined TPO, or according to the second attenuation mode associated with the second predefined TPO (e.g. in order to limit the detection range of the RF signal by mobile device 104). Processor 200 may further be configured to communicate transactions with mobile device 104 over the SRC protocol, if the mobile device is located within the given operation range of the RF communication module 204.

According to some embodiments, attenuation module 208 may be, or include, at least one of an analog RF attenuation module or a digital step RF attenuation module (not shown). Attenuation module 208 may be configured to attenuate an RF transmission signal of RF communication module 204 by directing the transmission signal through the at least one of the analog RF attenuator and digital step RF attenuator.

According to some embodiments, attenuation module 208 may be associated with at least one antenna, and preferably at least two antennae, including for example an on-board printed circuit board (PCB) antenna 210a and an external antenna 210c. The external antenna 210c may be associated with attenuation module 208 via at least one external antenna interface 210b.

According to some embodiments, external antenna 210c may be located outside SM 106, in which case external antenna interface 210b may be connected to external antenna 150c via a cable (e.g. a coaxial cable).

According to some embodiments, attenuation module 208 may be configured to attenuate an RF transmission signal of RF communication module 204 by performing one or more of:

1) switching the RF transmission from a first antenna to a second antenna (e.g. from external antenna 210c to on-board antenna 210a);

2) disconnecting at least one antenna (e.g. external antenna 210c); and/or 3) controlling at least one antenna (e.g. 210a, 210c) to perform beam shaping.

According to some embodiments, processor 200 may be configured to command the attenuation module 208 to work in one of the first attenuation mode and the second attenuation mode. The first attenuation mode may be associated with a first level of attenuation of the RF transmission signal of RF communication module 204, and with a first TPO level of the signal transmitted by transaction apparatus 102 (via RF communication module 204). The second attenuation mode may be associated with a second level of attenuation, and with a second TPO level of the signal transmitted by transaction apparatus 102 (via RF communication module 204).

According to some embodiments, the first TPO level of the signal transmitted by transaction apparatus 102 may be lower than the second TPO level. For example, the first TPO level may be less than −90 decibel-milliwatts (dBm) and the second TPO level may be greater than −80 dBm. Accordingly, mobile device 104 and transaction apparatus 102 may be required to be in close proximity in order to communicate over the SRC protocol, when transaction apparatus 102 is in the first attenuation mode.

According to some embodiments, the second TPO level may allow transmission of the RF signal to the given operation range of the RF communication module 204, while the first TPO level may limit transmission of the RF signal to detection range significantly smaller than the given operation range. In some embodiments, the detection range may be 0-25 cm from the service machine 106.

According to some embodiments, in the first attenuation mode, the RF communication module 204 is configured to initiate communication and perform the handshake with the mobile device 104 over a SRC protocol. According to some embodiments, in the second attenuation mode, the RF communication module 204 is configured to communicate with the mobile device 104 over the same SRC protocol as used for the handshake.

According to some embodiments, the processor 200 may be configured to command the attenuation module 208 to switch from the first attenuation mode to the second attenuation mode upon completion of a handshake between the RF communication module 204 and the mobile device 104. The processor 200 may further be configured to command the attenuation module 208 to switch back to the second attenuation mode if the communication between the RF communication module 204 and the mobile device 104 is interrupted, or upon completion of a transaction between the mobile device 104 and the service machine 106.

According to some embodiments, transaction apparatus 102 may further include at least one peripheral communication module 206 configured to facilitate communication between processor 200 and controller 108. According to some embodiments, processor 200 may communicate with controller 108 to obtain information from the controller and/or to control SM 106, as elaborated further below.

According to some embodiments, transaction apparatus 102 may further include at least one Secure Access Module (SAM) 212 configured to store at least one of a symmetric and/or asymmetric cryptographic key for facilitating secure, end-to-end transactions between transaction apparatus 102 and transaction server 110 via the mobile device, as elaborated further below.

Figure 3:
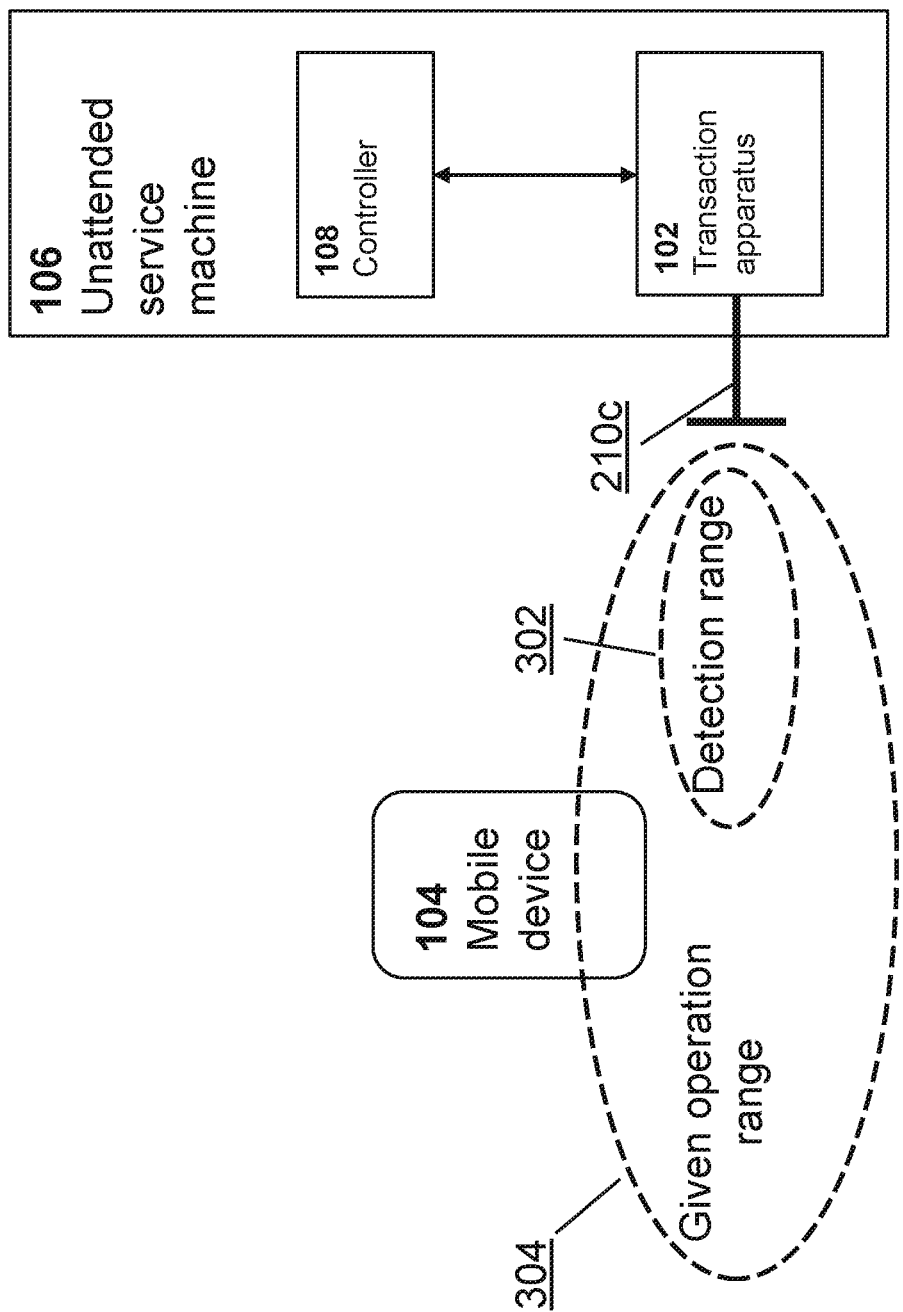
FIG. 3 shows a schematic block diagram depicting an embodiment of operation areas associated with the transaction apparatus disclosed herein.

Reference is now made to FIG. 3, which shows a schematic block diagram depicting an embodiment of operation areas associated with the transaction apparatus. As shown in FIG. 3, transaction apparatus 102 may transmit RF signals through external antenna 210c, to either the detection range 302 or the given operation range 304 which is beyond the detection range and can be even several feet/meters away from SM 106.

In the first attenuation mode, transaction apparatus 102 may transmit RF signals to the detection range 302. Accordingly, mobile device 104 must be placed within the detection range 302 in order to detect the RF signal and communicate with the SM 106 using an SRC protocol.

In the second attenuation mode, transaction apparatus 102 may transmit RF signals to the given operation range 304. Accordingly, mobile device 104 may be moved away from the detection range 302 and into the given operation range 304 where it can detect the RF signal and communicate with the SM 106 over the same SRC protocol. This advantageously provides high-speed communication over a distance that exceeds the detection range 302, without performing a handover to another protocol, and without requiring implementation of additional communication technology. The given operation range 304 is sufficiently large to allow a user of the mobile device to comfortably transact with the service machine using the mobile device at a distance greater than that permitted by ordinary NFC communication (which may require proximity to the point of almost touching). For example, the comfort operation detection area can be a distance of several feet away (or meters) from the service machine. This advantageously allows the user to operate the mobile device comfortably in order to perform a transaction.

Figure 4A:
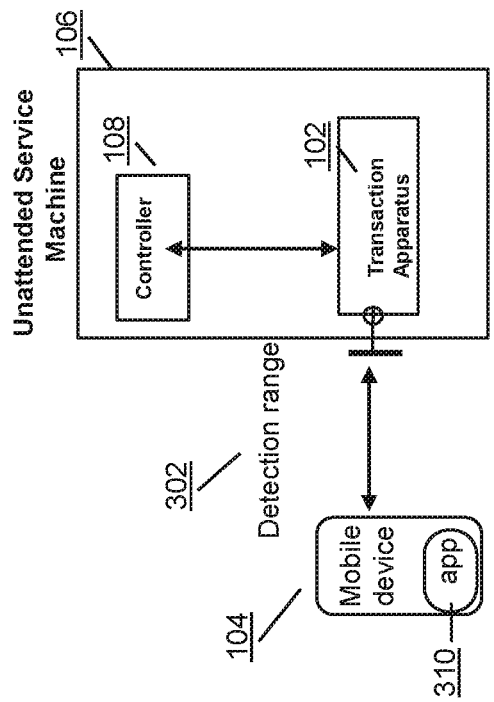
FIGS. 4A-4C show schematic block diagrams depicting embodiments of the operation of the system for facilitating secured transactions disclosed herein.
Figure 4B:
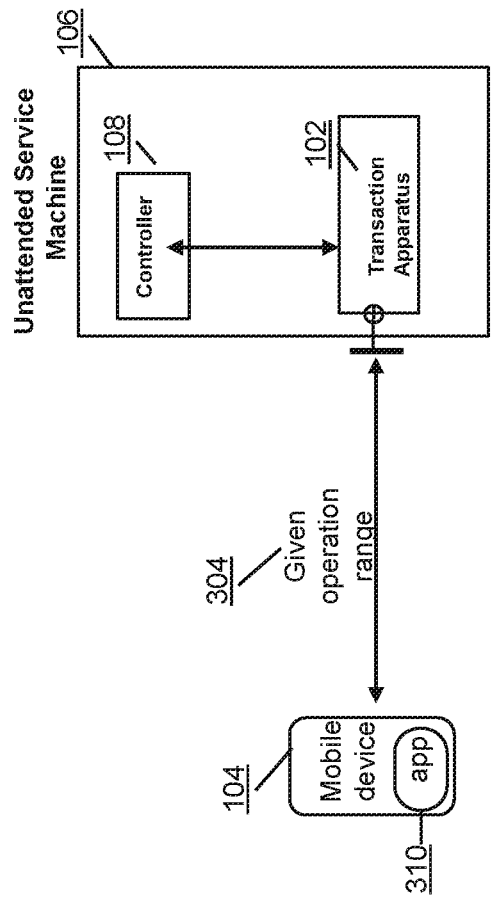
Figure 4C:
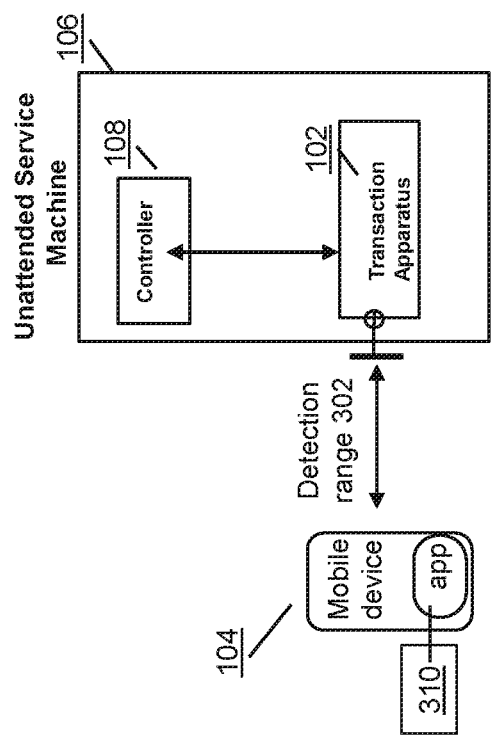

Reference is now made to FIGS. 4A, 4B and 4C, showing schematic block diagrams depicting embodiments of the operation of the system for facilitating secured transactions.

As shown in FIG. 4A, transaction apparatus 102 and mobile device 104 are initially disconnected. In the disconnected state, processor 200 may be configured to command attenuation module 208 to work in the first attenuation mode thereby limiting the detection-range of the RF signal to the detection range 302.

According to some embodiments, when mobile device 104 is placed within detection range 302, mobile device 104 may detect the transmission of transaction apparatus 102 over the SRC protocol, and may initiate a handshake with transaction apparatus 102. For example, mobile device 104 may send a connection request message to transaction apparatus 102, and await a connection acknowledgement message from transaction apparatus 102, to establish the connection. Processor 200 may control RF communication module 204 to complete the handshake with mobile device 104 over the SRC protocol.

In some embodiments, a user may be required to first launch an application 310 on mobile device 104 which puts the mobile device in a scanning mode and enables it to detect the RF signal transmitted by transaction apparatus 102. In other embodiments, the mobile device may detect the RF signal automatically without the user launching application 310. In still other embodiments, the mobile device may detect the RF signal automatically and upon detection, automatically launch application 310 (which may include, e.g. a user interface for interacting with the transaction apparatus 102 as will be elaborated below).

As shown in FIG. 4B, when the handshake is completed successfully, transaction apparatus 102 and mobile device 104 may switch to a connected state. Processor 200 may command attenuation module 208 to switch to the second attenuation mode, so as to enable the transaction apparatus 102 to continue to communicate with the mobile device over the same SRC protocol but at a greater physical distance than that used for the handshake. In the second attenuation mode, transaction apparatus 102 communicates with the mobile device 104 at greater distance, the mobile device having now been moved to the given operation range 304.

As shown in FIG. 4C, if the communication between transaction apparatus 102 and mobile device 104 is interrupted (e.g. due to failure in communication) or if the transaction is completed, processor 200 may command attenuation module 208 to switch back to the first attenuation mode to limit the range of signal detection by mobile device 104 to the detection range 302 in preparation for the next mobile device handshake.

According to some embodiments, the disclosed system may facilitate secure transactions between controller 108 of SM 106 and at least one transaction server 110. For example, processor 200 may be configured to perform certain functions related to processing secure transactions. By way of non-limiting example, processor 200 may be configured to:

i) receive transaction data from controller 108, including for example: an identity of an unattended service machine, a type of the unattended service machine, a price of a product vended by the machine, etc.;

ii) obtain at least one cryptographic key (e.g. a symmetric cryptographic key or a pair of public/private asymmetric cryptographic key) from secured access module 212;

iii) encrypt the transaction data using the at least one cryptographic key and optionally add a random component to the transaction data;

iv) communicate the encrypted transaction data to the mobile device over a first-protocol;

v) receive an encrypted transaction code from the mobile device over the first-protocol, indicating whether the transaction has been successfully cleared by transaction server 110, where the encrypted transaction code may include a random component;

vi) decrypt the received transaction code using the at least one cryptographic key; and vii) send the decrypted transaction response to controller 108 to finalize the transaction.

Figure 5:
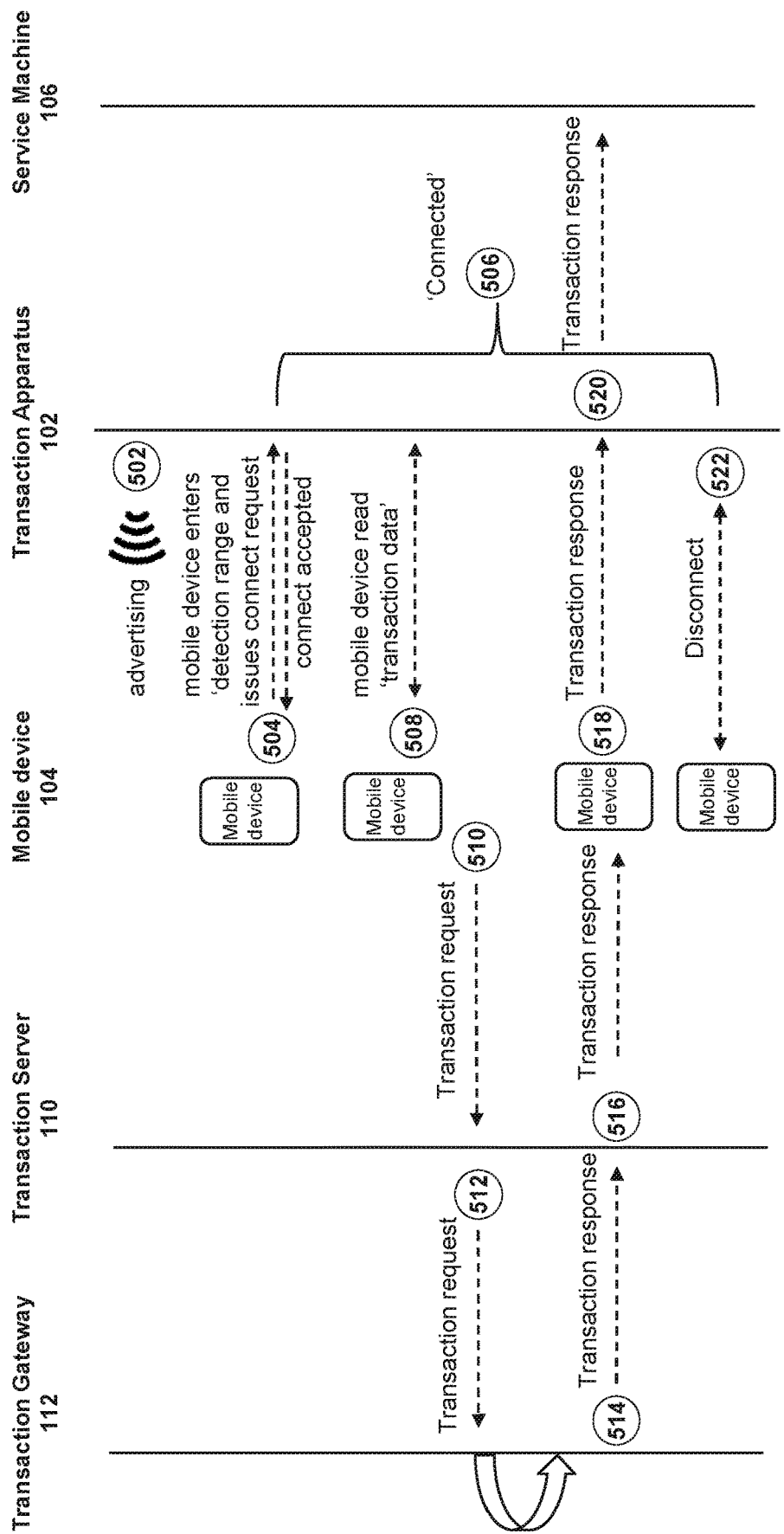
FIG. 5 shows a flow diagram depicting communication flows between components in a first embodiment of a method of facilitating a secure transaction disclosed herein.

Reference is now made to FIG. 5, showing a flow diagram depicting communication flows between the various components in a first embodiment of a method of facilitating a secure transaction. The method depicted in FIG. 5 accommodates a scenario in which no selection needs to be done on SM 106. For example, SM 106 may be configured to provide a single service or a single product, such as an unattended washing machine.

In step 502, mobile device 104 and transaction apparatus 102 may both be in 'disconnected' state. Transaction apparatus 102 may emit RF transmission over the SRC protocol.

In step 504, mobile device 104 may be placed within the detection range 302. According to some embodiments, mobile device 104 and transaction apparatus 102 may perform a connection handshake over the SRC protocol, including at least one of a connection request, sent from mobile device 104 to transaction apparatus 102, and a connection-accept acknowledgement, sent from transaction apparatus 102 to mobile device 104.

In step 506, following a successful connection handshake, mobile device 104 and transaction apparatus 102 may enter a 'connected' state. Transaction apparatus 102 may switch to the second attenuation mode and facilitate communication with mobile device 104 in the given operation range 304 over the SRC protocol.

In step 508, mobile device 104 and transaction apparatus 102 may exchange transaction information over the SRC protocol. For example, transaction apparatus 102 may communicate an identity of SM 106 and a cost of a service provided by SM 106 to mobile device 104. According to some embodiments, the communication between mobile device 104 and transaction apparatus 102 may include at least one encrypted transaction request that is encrypted by secured access module 212 of transaction apparatus 102.

In step 510, mobile device 104 may communicate the encrypted transaction request to transaction server 110 over a wired or wireless data communication protocol.

According to some embodiments, as depicted in steps 512 and 514, transaction server 110 may forward the transaction request to a transaction gateway 112 (e.g. a server associated with a bank or a clearing authority) to obtain clearance of the transaction request, in a transaction-response therefrom.

In step 516, transaction server 110 may forward the transaction response to mobile device 104.

In step 518, mobile device 104 may add a transaction code to the transaction response, and forward the transaction response to transaction apparatus 102 over the SRC protocol.

In step 520, transaction apparatus 102 may communicate with controller 108 of service machine 106, to control at least one operation of service machine 106 according to the transaction response (e.g. activate an unattended washing machine).

In step 522, transaction apparatus 102 and mobile device 104 may communicate to end the transaction, and return transaction apparatus 102 and mobile device 104 to the 'disconnected' state.

Figure 6:
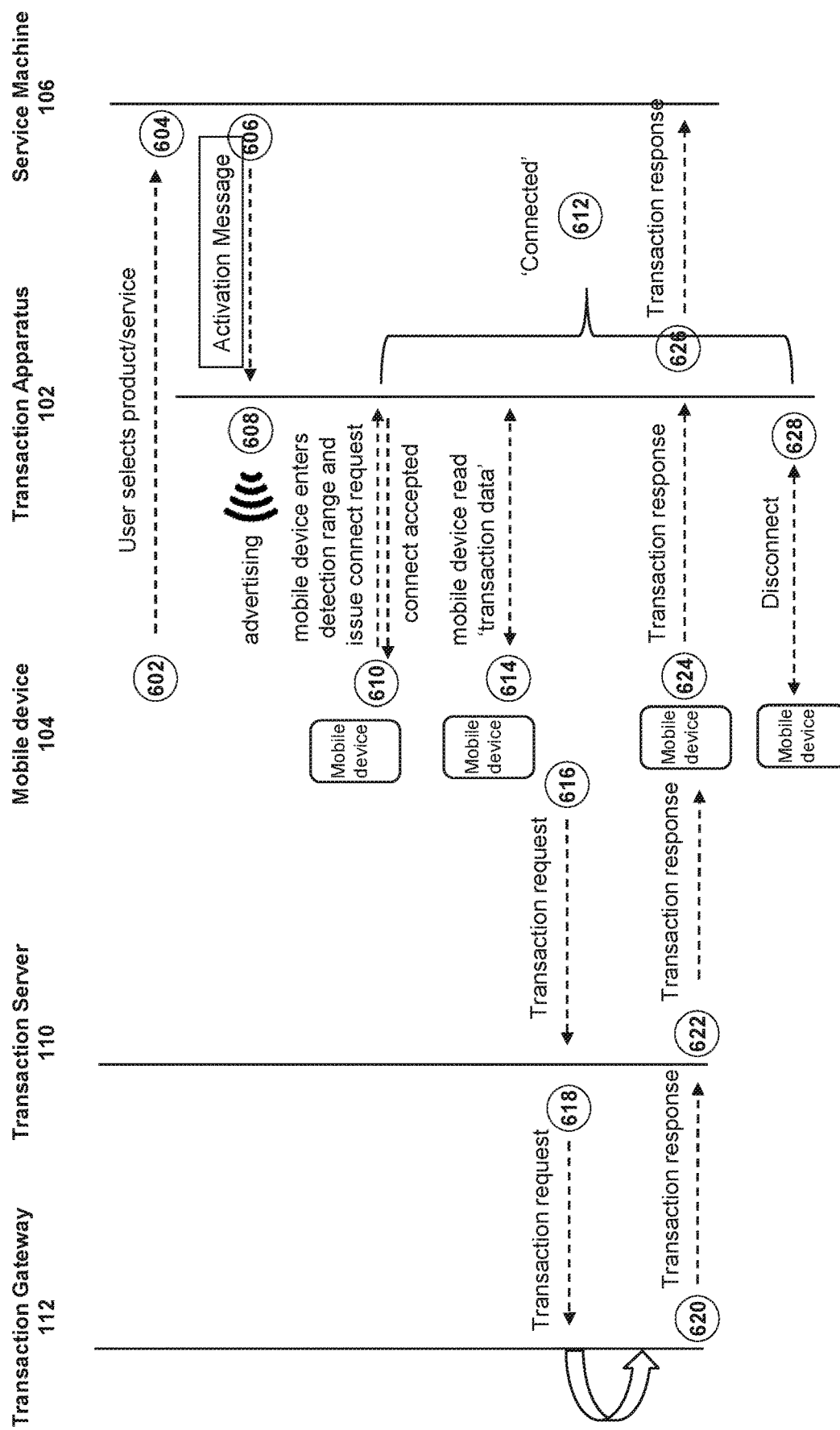
FIG. 6 shows a flow diagram depicting communication flows between components in a second embodiment of a method of facilitating a secure transaction disclosed herein.

Reference is now made to FIG. 6, showing a flow diagram depicting communication flows between components in a second embodiment of a method of facilitating a secure transaction. The method depicted in FIG. 6 accommodates a scenario in which a preliminary selection needs to be done on service machine 106. For example, service machine 106 may be an unattended vending machine, providing a selection of items (e.g. a variety of chocolate bars) for sale.

In step 602, a user may select a specific service or product (e.g. a specific chocolate bar) to initiate the communication process.

In steps 604 and 606, controller 108 may receive the user's selection and send an activation message to transaction apparatus 102.

In step 608, transaction apparatus 102 may advertise its operation by emitting RF transmission over the SRC protocol.

In step 610, mobile device 104 may be placed within the detection range 302. According to some embodiments, mobile device 104 and transaction apparatus 102 may perform a connection handshake over the SRC protocol, including at least one of a connection request, sent from mobile device 104 to transaction apparatus 102, and a connection-accept acknowledgement, sent from transaction apparatus 102 to mobile device 104.

In step 612, following a successful connection handshake, mobile device 104 and transaction apparatus 102 may enter a 'connected' state. Transaction apparatus 102 may switch to the second attenuation mode and facilitate communication with mobile device 104 in the given operation range 304 over the SRC protocol.

In step 614, mobile device 104 and transaction apparatus 102 may exchange transaction information over the SRC protocol. For example, transaction apparatus 102 may communicate an identity of service machine 106, at least one parameter associated with the user's selection (e.g. the selected type of chocolate bar) and a cost of a service provided by service machine 106 to transaction apparatus 102. According to some embodiments, the communication between mobile device 104 and transaction apparatus 102 may include at least one encrypted transaction request that is encrypted by secured access module 212.

In step 616, mobile device 104 may communicate the encrypted transaction request to transaction server 110 over a wired or wireless data communication protocol.

According to some embodiments, as depicted in step 618, transaction server 110 may forward the transaction request to a transaction gateway 112 to obtain clearance of the transaction request, in a transaction-response therefrom.

In steps 620 and 622, transaction gateway 112 may forward the authorization-response to transaction server 110, and transaction server 110 may forward the authorization-response to mobile device 104.

In step 624, mobile device 104 may forward the transaction-response to transaction apparatus 102 over the SRC protocol.

In step 626, transaction apparatus 102 may communicate with controller 108 of service machine 106, to control at least one operation of service machine 106 according to the transaction-response (e.g. drop a selected chocolate bar to a collection bin).

In step 628, transaction apparatus 102 and mobile device 104 may communicate to end the transaction, and return transaction apparatus 102 and mobile device 104 to the 'disconnected' state.

Figure 7:
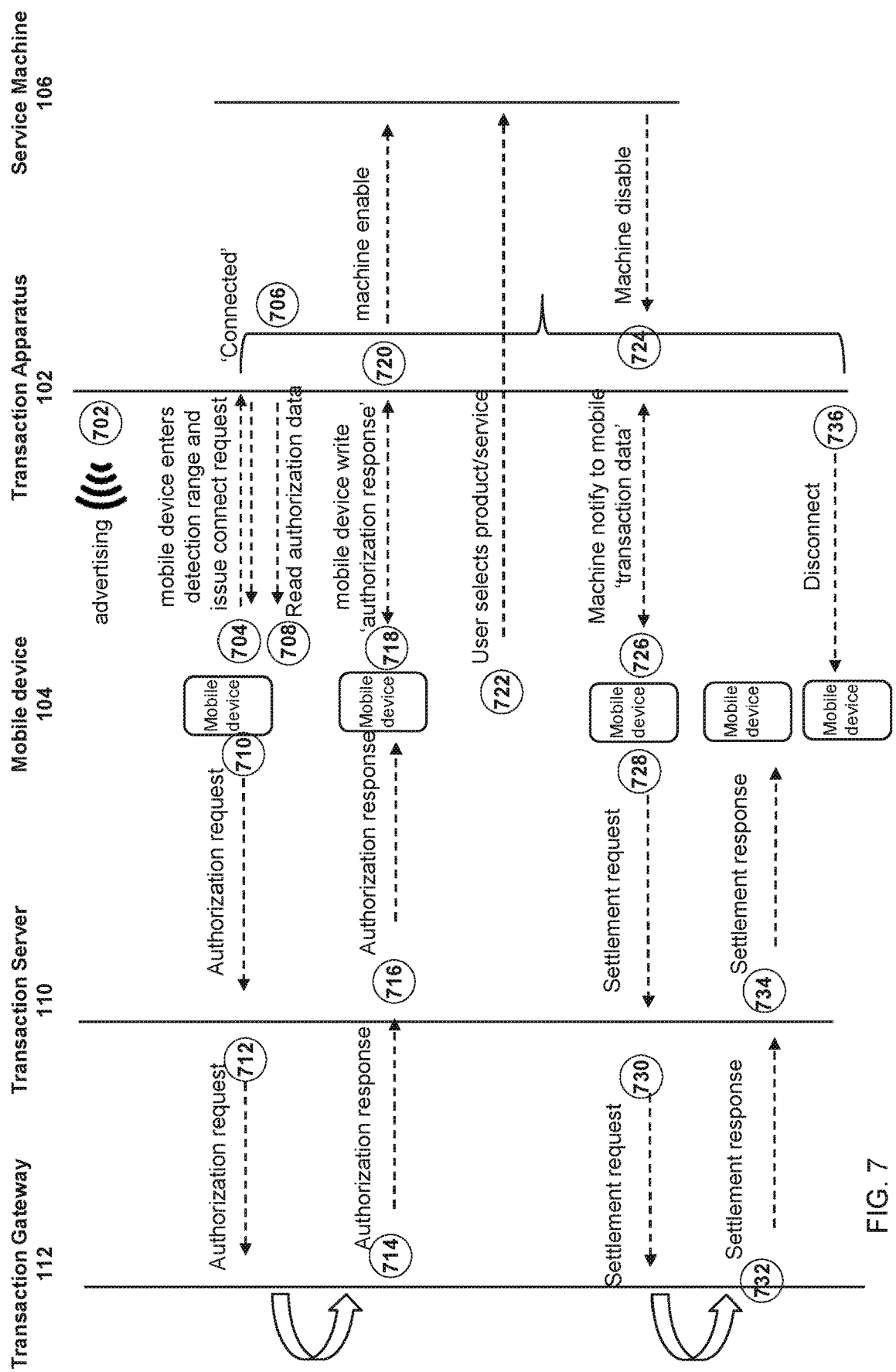
FIG. 7 shows a flow diagram depicting communication flows between components in a third embodiment of a method of facilitating a secure transaction disclosed herein.

Reference is now made to FIG. 7, showing a flow diagram depicting communication flows between components in a third embodiment of a method of facilitating a secure transaction. The method depicted in FIG. 7 accommodates a scenario in which a preliminary authorization of a transaction needs to be performed prior to providing a service by service machine 106. For example, service machine 106 may be an unattended fuel dispenser at a gasoline station that requires authorization of a user's credit prior to enabling the user to pump fuel.

In step 702, transaction apparatus 102 may advertise its operation by emitting RF transmission over the SRC protocol.

In step 704, mobile device 104 may be placed within the detection range 302. According to some embodiments, mobile device 104 and transaction apparatus 102 may perform a connection handshake over the SRC protocol, including at least one of a connection request, sent from mobile device 104 to transaction apparatus 102, and a connection-accept acknowledgement, sent from transaction apparatus 102 to mobile device 104.

In step 706, following a successful connection handshake, mobile device 104 and transaction apparatus 102 may enter a 'connected' state. Transaction apparatus 102 may switch to the second attenuation mode and facilitate communication with mobile device 104 in the given operation range 304 over the SRC protocol.

In step 708, mobile device 104 and transaction apparatus 102 may exchange authorization data over the SRC protocol. For example, transaction apparatus 102 may communicate an identity of service machine 106 and a minimum credit limit required for a transaction provided by service machine 106. According to some embodiments, the communication between mobile device 104 and transaction apparatus 102 may include at least one encrypted authorization request that is encrypted by secured access module 212 of transaction apparatus 102.

In step 710, mobile device 104 may communicate the encrypted authorization request to transaction server 110 over a wired or wireless data communication protocol.

According to some embodiments, as depicted in step 712, transaction server 110 may forward the authorization request to a transaction gateway 112 to obtain clearance of the authorization request, in an authorization-response therefrom.

In steps 714 and 716, transaction gateway 112 may forward the authorization-response to transaction server 110, and transaction server 110 may forward the authorization-response to mobile device 104.

In step 718, mobile device 104 may forward the authorization-response to transaction apparatus 102 over the SRC protocol.

In step 720, transaction apparatus 102 may send a message to the controller 108 to activate the service machine 106 (e.g. activate a fuel pump).

In step 722, controller 108 of service machine 106 may enable a user to select a product or a service on the service machine 106 (e.g. select a fuel type) and operate service machine 106 (e.g. pump fuel into a vehicle).

In step 724, service machine 106 completes delivery of the product (e.g. fuel tank is full) and controller 108 may disable the operation of service machine 106.

In step 726, when an operation is finished (e.g. a user has returned a gas-pump nozzle to its place), controller 108 of service machine 106 may communicate transaction data to mobile device 104 over the SRC protocol, including information regarding the transaction, such as a total charge (e.g. a sum required for payment by the owner of mobile device 104). According to some embodiments, the communication between mobile device 104 and transaction apparatus 102 may include at least one encrypted transaction request that is encrypted by secured access module 212 of transaction apparatus 102.

In step 728, mobile device 104 may communicate a settlement request to transaction server 110 based on the transaction data, over a wired or wireless data communication protocol.

According to some embodiments, as depicted in step 730, transaction server 110 may forward the settlement request to a transaction gateway 112 to obtain clearance of the settlement request, in a settlement-response therefrom.

In steps 732 and 734, transaction gateway 112 may forward the settlement-response to transaction server 110 which subsequently may forward the settlement-response to mobile device 104.

In step 736, transaction apparatus 102 and mobile device 104 may communicate to end the transaction, and return transaction apparatus 102 and mobile device 104 to a 'disconnected' state.

Figure 8:
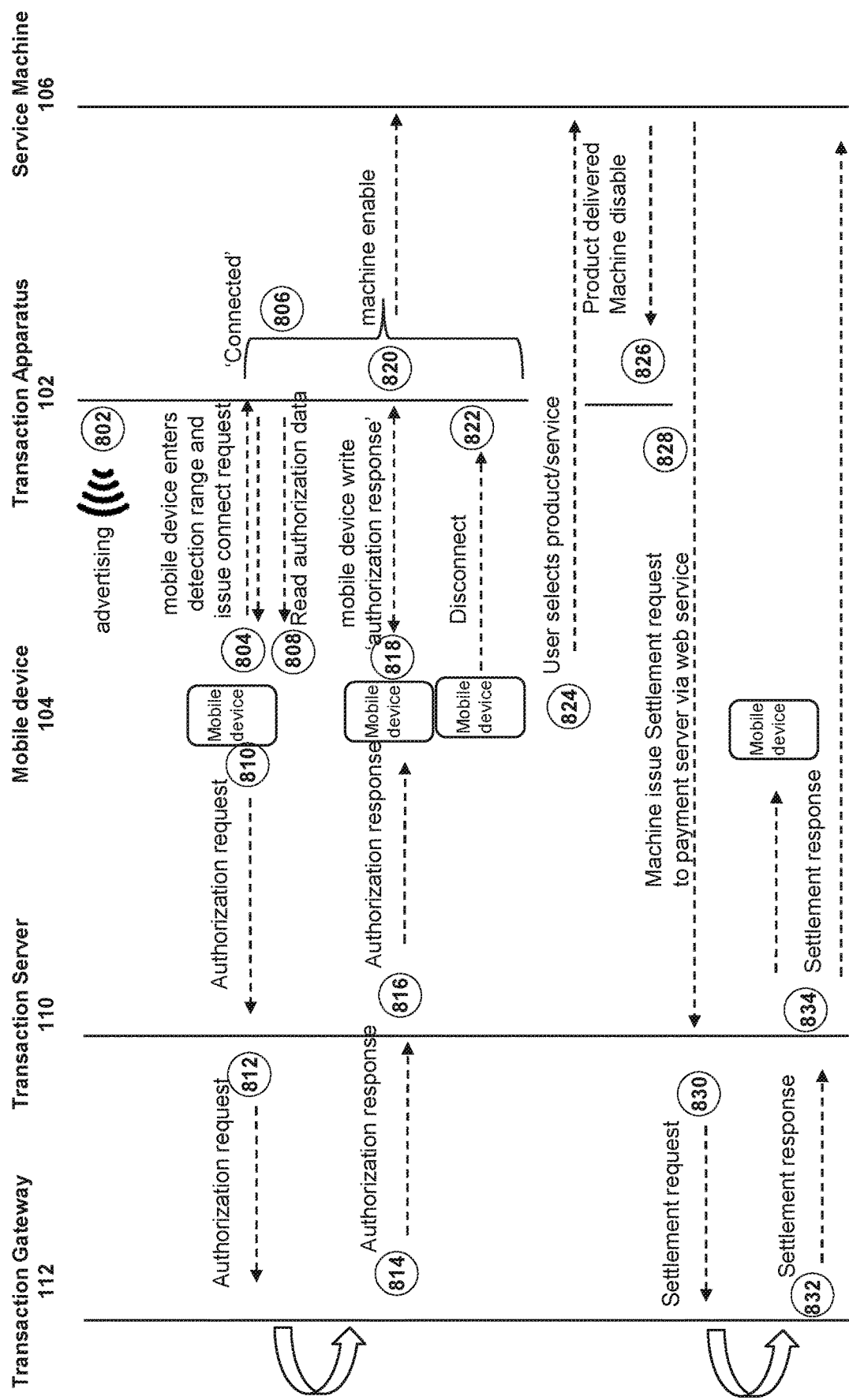
FIG. 8 shows a flow diagram depicting communication flows between components in a fourth embodiment of a method of facilitating a secure transaction disclosed herein.

Reference is now made to FIG. 8, showing a flow diagram depicting communication flows between components in a fourth embodiment of a method of facilitating a secure transaction. The method depicted in FIG. 8 accommodates a scenario in which a preliminary authorization of a transaction needs to be performed prior to providing a service by service machine 106, in a similar manner to the method discussed above in relation to FIG. 7. Unlike the previous example, in this embodiment the final settlement of payment is performed over a connection of controller 108 of service machine 106 to transaction server 110.

In this embodiment, steps 802 through 820 may be identical to respective steps 702 through 720 discussed above in relation to the embodiment shown in FIG. 7, and will not be repeated here for the purpose of brevity.

In step 822, transaction apparatus 102 may communicate with mobile device 104 to end communication over the SRC protocol, and return transaction apparatus 102 and mobile device 104 to 'disconnected' state.

In step 824, service machine controller 108 may enable a user to select a product or a service on the service machine 106 (e.g. select a fuel type) and operate service machine 106 (e.g. pump fuel into a vehicle).

In step 826, when an operation is finished (e.g. a user has returned a gas-pump nozzle to its place), controller 108 of service machine 106 may a settlement request to transaction server 110 via a web service. According to some embodiments, the settlement request may include information regarding the transaction, such as a total charge (e.g. a sum required for payment by the owner of mobile device 104) and the identity of service machine 106.

According to some embodiments, as depicted in steps 828 and 830, transaction server 110 may forward the settlement request to a transaction gateway 112 to obtain clearance of the settlement request, in a settlement-response therefrom.

In step 832, transaction server 110 may forward the settlement-response to mobile device 104, and to service machine controller 108, to finalize the transaction.

As explained above, following a successful connection handshake, mobile device 104 and transaction apparatus 102 may enter a 'connected' state, and processor 200 may command transaction apparatus 102 to communicate with mobile device 104 over the SRC protocol, at a comfortable distance (e.g. given operation range 304 of FIG. 3) that is beyond the detection range 302). According to some embodiments, mobile device 104 may communicate with transaction apparatus 102 over the SRC protocol, to display a user interface (UI). The UI may be configured to perform at least one of: presenting data that is dedicated to a type of service machine 106 (e.g. present a table of products available for sale on an unattended POS vending machine); presenting data that is specific to at least one service machine 106 (e.g. how many soda drink cans are available on a vending machine, and their respective price); and enabling a user to perform actions on the at least one service machine 106 (e.g. buy a soda drink can).

Figure 9:
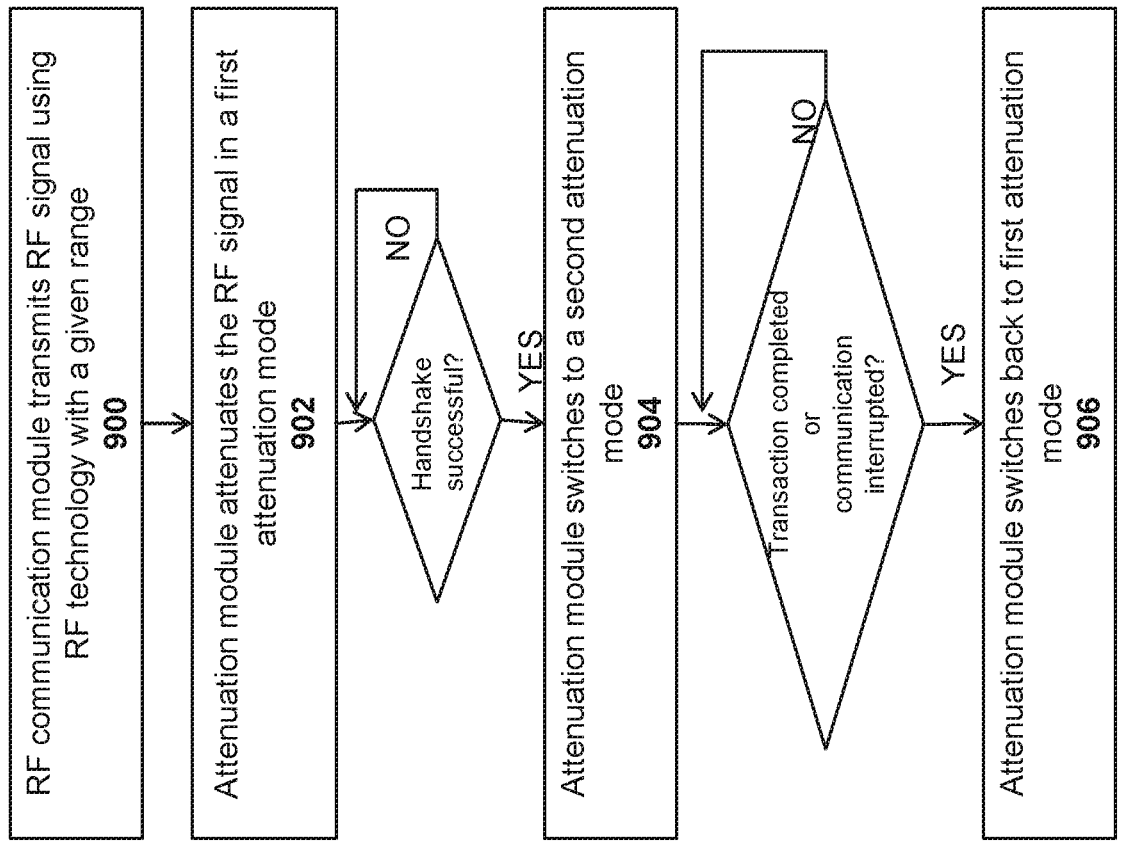
FIG. 9 shows a flow chart depicting an embodiment of a method of facilitating a secure transaction disclosed herein.

Reference is now made to FIG. 9, showing a flow chart depicting an embodiment of a method of facilitating transactions between a mobile device and a service machine. Unless indicated otherwise, all steps are performed upon a command issued by processor 200.

In step 900, the RF communication module 204 transmits a RF signal using RF technology with a given operation range 304, as elaborated above.

In step 902, the RF attenuation module 208 attenuates the RF signal in a first attenuation mode, associated with a first predefined TPO, such that communication between the apparatus and the mobile device starts only when the mobile device is positioned relative to the service machine in a detection range that is significantly smaller than the given operation range, as elaborated above.

In step 904, upon a successful handshake between the RF communication module 204 and the mobile device 104, the attenuation module 208 switches to a second attenuation mode, associated with a second predefined TPO, with a transmission range larger than the detection range, as elaborated above.

In step 906, upon the completion of the transaction or interruption in communication between RF communication module 204 and the mobile device 104, the attenuation module 208 switches back to first attenuation mode, as elaborated above.

While certain features of the disclosed subject matter have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosed subject matter.

What is claimed is:

1. Apparatus for facilitating transactions between a mobile device and a service machine, comprising:
   a) a wireless radio frequency (RF) communication module configured to transmit a RF signal using a RF technology with a given operation range; and
   b) a hardware attenuation module configured to attenuate the RF signal of the RF communication module to a predefined first Transmitted Power Output (TPO) such that communication between the apparatus and the mobile device starts only when the mobile device is positioned relative to the service machine in a detection range limited by the first TPO, wherein the detection range is in the range of 0-25 cm,
   wherein upon completion of a handshake between the RF communication module and the mobile device at the first TPO, the hardware attenuation module increases the RF signal of the RF communication module to a second TPO with a communication range larger than the detection range while in a connected state with the mobile device.

2. The apparatus of claim 1, further comprising:
   c) a processor configured to command the attenuation module to attenuate the RF transmission signal in the first TPO.

3. The apparatus of claim 2, wherein the processor is further configured to command the attenuation module to switch between the predefined first TPO and the second TPO.

4. The apparatus of claim 3, wherein if the communication between the RF communication module and the mobile device is interrupted, or upon completion of a transaction between the mobile device and the service machine, the processor is further configured to command the attenuation module to switch back to the first TPO.

5. The apparatus of claim 2, further comprising a secure access module (SAM) configured to store at least one of a symmetric and asymmetric cryptographic key for facilitating secure, end-to-end transactions between the service machine and a transaction server.

6. The apparatus of claim 5, wherein the processor is further configured to:
   receive transaction data from the service machine relating to a pending transaction,
   obtain at least one of a symmetric cryptographic key or an as an asymmetric cryptographic key from the secure access module,
   encrypt the transaction data using the at least one cryptographic key,
   communicate the encrypted transaction data to the mobile device,
   receive an encrypted transaction code data from the mobile de % ice indicating whether the transaction has been successfully cleared by the transaction server,
   decrypt the received transaction code data, and
   send the decrypted transaction response data to the controller to finalize the transaction.

7. The apparatus of claim 1, wherein the wireless RF technology is selected from the group consisting of a Bluetooth Low Energy (BLE) technology, a Bluetooth technology, a WiFI technology and a WiFi direct technology.

8. The apparatus of claim 1, wherein the hardware attenuation module is a hardware analog RF attenuation module.

9. The apparatus of claim 1, wherein the hardware attenuation module is a hardware digital step RF attenuation module.

10. The apparatus of claim 1, wherein in the first TPO, the RF communication module is configured to initiate communication and perform the handshake with the mobile device over a SRC protocol.

11. The apparatus of claim 10, wherein in the second TPO, the RF communication module is configured to communicate with the mobile device over the same SRC protocol as used for the handshake.

12. A method for facilitating transactions between a mobile device and a service machine, comprising:
   a) transmitting a radio frequency (RF) signal by an RF communication module using a RF technology with a given operation range;
   b) by a hardware attenuation module, attenuating the RF signal of the RF communication module to a predefined first Transmitted Power Output (TPO) that communication between the apparatus and the mobile device starts only when the mobile device is positioned relative to the service machine in a detection range limited by the first TPO, wherein the detection range is in the range of 0-25 cm; and
   c) by the hardware attenuation module, while in a connected state with the mobile device, increasing the RF signal to a second TPO with a communication range larger than the detection range upon completion of a handshake at the first TPO between the RF communication module and the mobile device.

13. The method of claim 12, further comprising switching back to the first TPO if the communication between the RF communication module and the mobile device is interrupted, or upon completion of a transaction between the mobile device and the service machine.

14. The method of claim 12, herein the wireless RF technology is selected from the group consisting of a Bluetooth Low Energy (BLE) technology, a Bluetooth technology, a WiFi technology and a WiFi direct technology.

15. The method of claim 12, wherein the hardware attenuation module is one of a hardware analog RF attenuation module or a hardware digital step RF attenuation module.

* * * * *